United States Patent
Derbeko et al.

(10) Patent No.: US 9,405,684 B1
(45) Date of Patent: Aug. 2, 2016

(54) SYSTEM AND METHOD FOR CACHE MANAGEMENT

(71) Applicant: EMC Corporation, Hopkinton, MA (US)

(72) Inventors: Philip Derbeko, Modiin (IL); Assaf Natanzon, Tel Aviv (IL); Anat Eyal, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 174 days.

(21) Appl. No.: 13/630,678

(22) Filed: Sep. 28, 2012

(51) Int. Cl.
   *G06F 12/08* (2016.01)
   *G06F 3/06* (2006.01)
   *G06F 17/30* (2006.01)

(52) U.S. Cl.
   CPC .... *G06F 12/08* (2013.01); *G06F 3/06* (2013.01); *G06F 17/30* (2013.01)

(58) Field of Classification Search
   CPC ........................................................ G06F 12/08
   USPC ........................................................ 711/1–200
   See application file for complete search history.

(56) References Cited

U.S. PATENT DOCUMENTS

| | | | |
|---|---|---|---|
| 6,704,730 B2 | 3/2004 | Moulton et al. | |
| 6,810,398 B2 * | 10/2004 | Moulton | |
| 7,788,220 B1 | 8/2010 | Auchmoody et al. | |
| 2009/0063795 A1 | 3/2009 | Yueh | |
| 2010/0094817 A1 * | 4/2010 | Ben-Shaul et al. | 707/697 |
| 2012/0166448 A1 * | 6/2012 | Li et al. | 707/747 |
| 2014/0013057 A1 * | 1/2014 | Agrawal et al. | 711/126 |

* cited by examiner

*Primary Examiner* — David X Yi
*Assistant Examiner* — Zubair Ahmed
(74) *Attorney, Agent, or Firm* — Brian J. Colandreo, Esq.; Mark H. Whittenberger, Esq.; Holland & Knight LLP

(57) ABSTRACT

A method, computer program product, and computing system for processing, on a host, a read request for a portion of a data file stored on a backend storage system. The portion of the data file is obtained from the backend storage system. The portion of the data file is divided into a plurality of file chunks based, at least in part, upon a file type. Each of the plurality of file chunks is compared to other file chunks stored within a frontend cache system associated with the host to identify unique file chunks within the plurality of file chunks. The unique file chunks are stored within the frontend cache system.

24 Claims, 3 Drawing Sheets

SYSTEM AND METHOD FOR CACHE MANAGEMENT

TECHNICAL FIELD

This disclosure relates to cache systems and, more particularly, to systems and methods for cache deduplication.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes processing, on a host, a read request for a portion of a data file stored on a backend storage system. The portion of the data file is obtained from the backend storage system. The portion of the data file is divided into a plurality of file chunks based, at least in part, upon a file type. Each of the plurality of file chunks is compared to other file chunks stored within a frontend cache system associated with the host to identify unique file chunks within the plurality of file chunks. The unique file chunks are stored within the frontend cache system.

One or more of the following features may be included. Comparing each of the plurality of file chunks to other file chunks stored within the frontend cache system may include identifying non-unique file chunks within the plurality of file chunks. The non-unique file chunks may not be stored within the frontend cache system. The portion of the data file may be a complete data file. The plurality of file chunks may have a common length and may be aligned. The plurality of file chunks may have differing lengths. The backend storage system may include a data array.

Dividing the portion of the data file into a plurality of file chunks may include dividing the portion of the data file into a plurality of file chunks based, at least in part, upon a sticky bit algorithm. Dividing the portion of the data file into a plurality of file chunks may include dividing the portion of the data file into a plurality of file chunks based, at least in part, upon a file structure.

In another implementation, a computer program product resides on a computer readable medium that has a plurality of instructions stored on it. When executed by a processor, the instructions cause the processor to perform operations including processing, on a host, a read request for a portion of a data file stored on a backend storage system. The portion of the data file is obtained from the backend storage system. The portion of the data file is divided into a plurality of file chunks based, at least in part, upon a file type. Each of the plurality of file chunks is compared to other file chunks stored within a frontend cache system associated with the host to identify unique file chunks within the plurality of file chunks. The unique file chunks are stored within the frontend cache system.

One or more of the following features may be included. Comparing each of the plurality of file chunks to other file chunks stored within the frontend cache system may include identifying non-unique file chunks within the plurality of file chunks. The non-unique file chunks may not be stored within the frontend cache system. The portion of the data file may be a complete data file. The plurality of file chunks may have a common length and may be aligned. The plurality of file chunks may have differing lengths. The backend storage system may include a data array.

Dividing the portion of the data file into a plurality of file chunks may include dividing the portion of the data file into a plurality of file chunks based, at least in part, upon a sticky bit algorithm. Dividing the portion of the data file into a plurality of file chunks may include dividing the portion of the data file into a plurality of file chunks based, at least in part, upon a file structure.

In another implementation, a computing system includes at least one processor and at least one memory architecture coupled with the at least one processor, wherein the computing system is configured to perform operations including processing, on a host, a read request for a portion of a data file stored on a backend storage system. The portion of the data file is obtained from the backend storage system. The portion of the data file is divided into a plurality of file chunks based, at least in part, upon a file type. Each of the plurality of file chunks is compared to other file chunks stored within a frontend cache system associated with the host to identify unique file chunks within the plurality of file chunks. The unique file chunks are stored within the frontend cache system.

One or more of the following features may be included. Comparing each of the plurality of file chunks to other file chunks stored within the frontend cache system may include identifying non-unique file chunks within the plurality of file chunks. The non-unique file chunks may not be stored within the frontend cache system. The portion of the data file may be a complete data file. The plurality of file chunks may have a common length and may be aligned. The plurality of file chunks may have differing lengths. The backend storage system may include a data array.

Dividing the portion of the data file into a plurality of file chunks may include dividing the portion of the data file into a plurality of file chunks based, at least in part, upon a sticky bit algorithm. Dividing the portion of the data file into a plurality of file chunks may include dividing the portion of the data file into a plurality of file chunks based, at least in part, upon a file structure.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
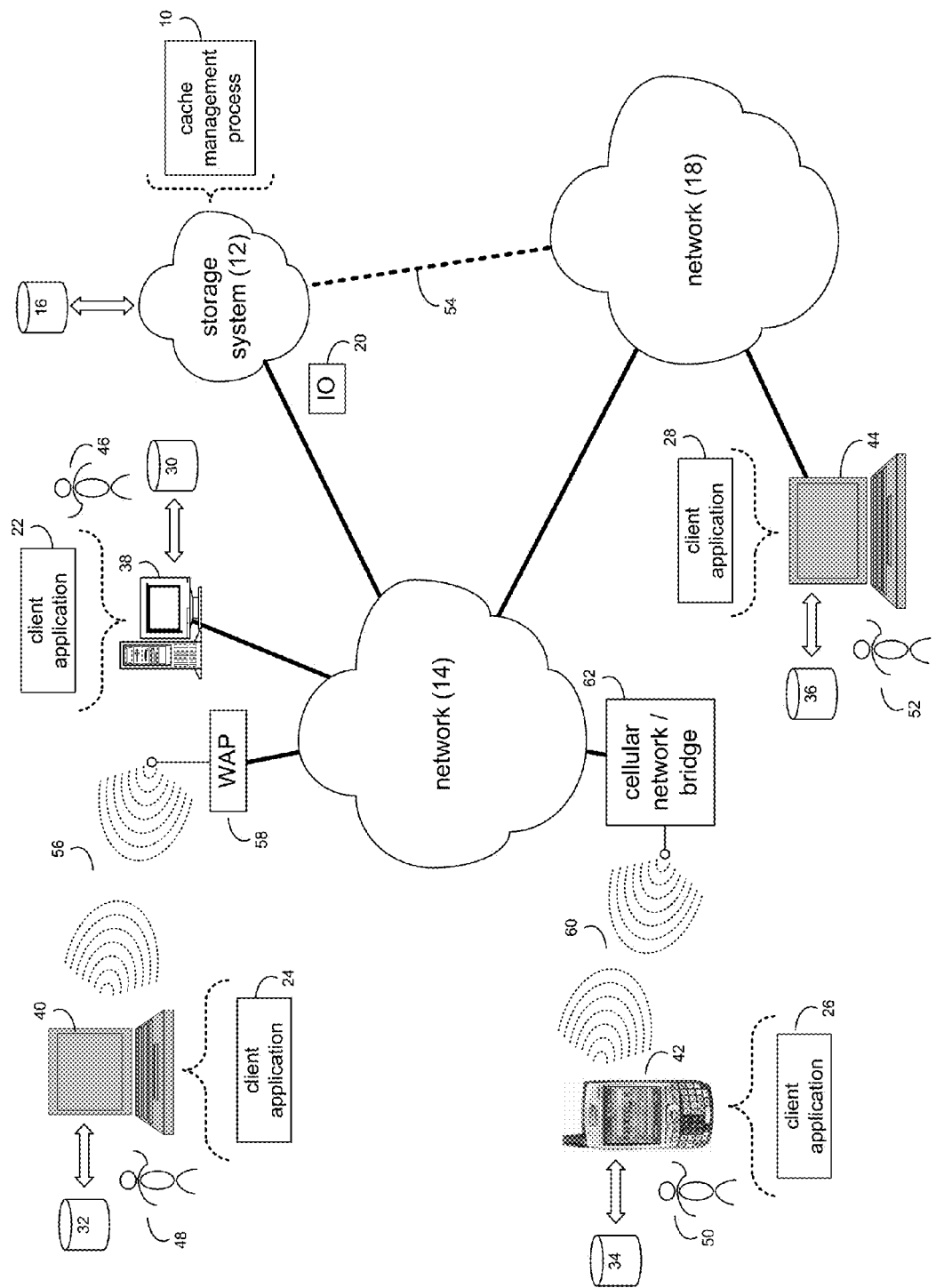
FIG. 1 is a diagrammatic view of a storage system and a cache management process coupled to a distributed computing network.

System Overview:

Referring to FIG. 1, there is shown cache management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of cache management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
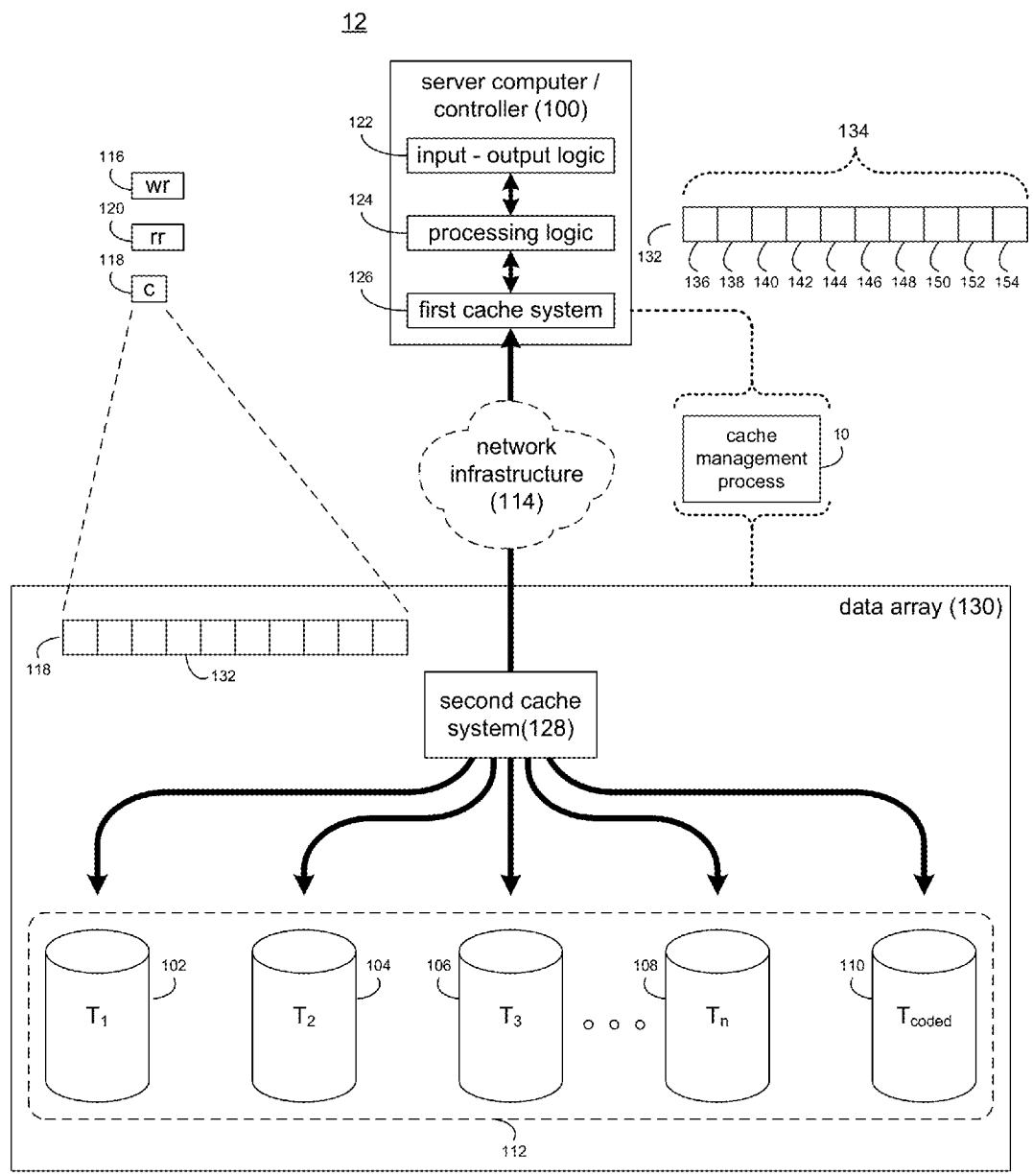
FIG. 2 is a diagrammatic view of the storage system of FIG. 1.
Figure 3:
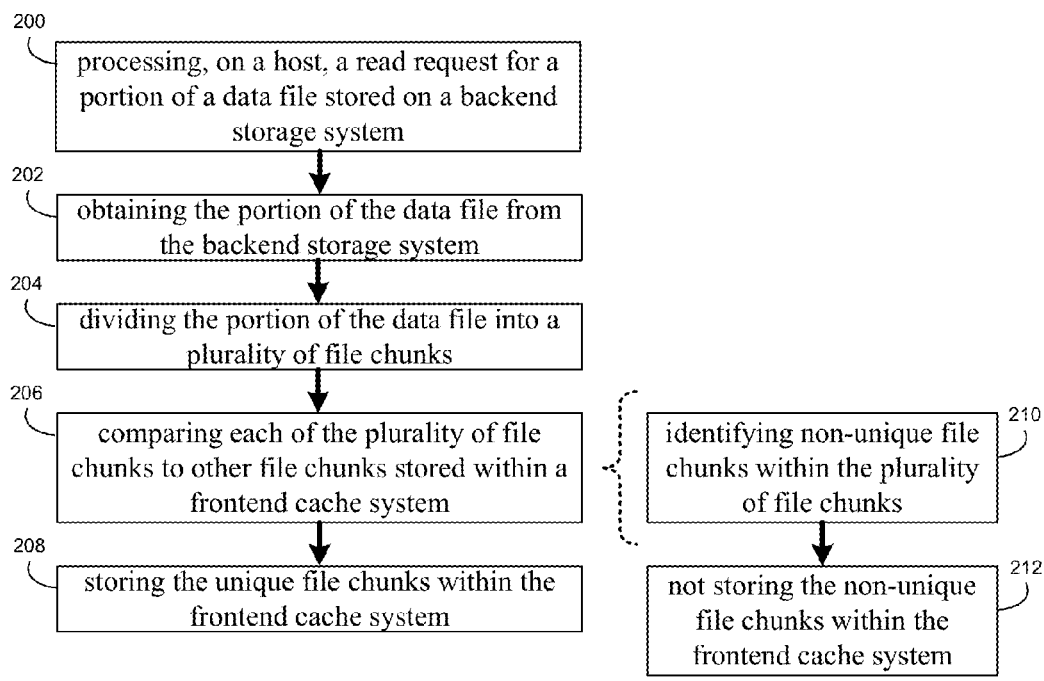
FIG. 3 is a flow chart of one implementation of the cache management process of FIG. 1.

Referring also to FIG. 2, storage system 12 may include a server computer/controller (e.g. server computer/controller 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of cache management process 10. The instruction sets and subroutines of cache management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of cache management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of cache management process 10 may be executed by one or more processors (not shown) and one or more memory architectures (not shown) included within data array 130.

The Cache Management Process:

As discussed above, various IO requests may be processed by server computer/controller 100, examples of which may include but are not limited to data write request 116 (i.e. a request that content 118 be written to storage system 12) and data read request 120 (i.e. a request that content 118 be read from storage system 12). Assume for illustrative proposes that content 118 is a considerably large file that resides within data array 130. Examples of such a large file may include but are not limited to a shared database file. Accordingly, when a read request is received concerning content 118 (which, as discussed, is resident on data array 130), only a small portion of content 118 may be retrieved and cached in response to such a read request (as it would be impractical/undesirable/unneeded to retrieve and cache content 118 in its entirety.

Assume for illustrative purposes that server computer/controller 100 receives such a read request 120 concerning only a portion of content 118 (e.g., portion 132 of content 118) currently stored on a backend storage system (e.g., data array 130). Cache management process 10 may process 200 (on the host e.g., server computer/controller 100) read request 120.

While content 118 is described above as a larger file and, therefore, read request 120 concerns only a portion of content 118, this is for illustrative purposes only and is not intended to be a limitation of this disclosure, as other configurations are possible and are considered to be within the scope of this disclosure and the claims. For example, in the event that content 118 is a smaller file, the portion requested in read request 120 may be the entire file (e.g., all of content 118), as opposed to a smaller amount).

Upon processing read request 120, cache management process 10 may obtain 202 portion 132 of the data file (e.g., content 118) from the backend storage system (e.g., data array 130) and may divide 204 portion 132 of content 118 into plurality of file chunks 134. For example, if portion 132 was a 128 kb portion of content 118, portion 132 may be divided 204 into thirty-two 4 kb chunks.

When dividing 204 portion 132 of content 118 into plurality of chunks 134, logic may be applied to increase the probability of commonality amongst chunks. Therefore, portion 132 may be divided 204 in accordance with the format/type of content 118. For example, text files may be divided 204 in accordance with a sticky bit algorithm.

A sticky bit algorithm is an algorithm that calculates a hash value for short sequences of data. For instance, if there is a data chunk of 100 KB, the sticky bit algorithm may calculate the hash value for every ten consecutive bytes of the data chunk and may identify a cut point (if the hash value modulo some constant is zero). For instance, if the hash value modulo 4,096 is 0, this assures that the file will be cut to portions that are roughly 4,096 bytes in length. If there is a large chunk with no cut point (e.g., a 40 KB chunk with no cut point), a cut point may be added artificially. This may happen e.g., if all the data is constant. The sticky bit algorithm may assure that if only a few bytes of data are added in the middle of a file, most chunks of the file will remain the same.

Additionally, video files may be divided 204 into video frames. Further, document files may be divided 204 based upon components (e.g., still images and text-based components). Accordingly, plurality of file chunks 134 may all have a common length or may have differing lengths (depending upon the manner in which they are divided).

Cache management process 10 may compare 206 each of plurality of file chunks 132 to other file chunks stored within a frontend cache system (e.g., first cache system 126) associated with the host (e.g., server computer/controller 100) to identify the unique file chunks within plurality of file chunks 132. A unique file chunk may be classified as a file chunk that is included within plurality of file chunks 132 that is not identical to any other file chunk already stored within first cache system 126. Once comparison 206 is performed and one or more unique file chunks are identified, cache management process 10 may store 208 the unique file chunks within first cache system 126.

When comparing 206 each of plurality of file chunks 132 to other file chunks already stored within first cache system 126, cache management process 10 may identify 210 non-unique file chunks within plurality of file chunks 132. A non-unique file chunk may be classified as a file chunk that is included within plurality of file chunks 132 that is identical to another file chunk already stored within first cache system 126. Once the non-unique file chunks are identified 210, cache management process 10 may not store 212 the non-unique file chunks within first cache system 126 (and/or delete the non-unique file chunks from their temporary storage location).

Accordingly, through the use of cache management process 10, only a single copy of a file chunk will be stored within first cache system 126. Accordingly, assume for illustrative purposes that four different files (or file portions) are currently stored within first cache system 126 due to the processing of four different read requests. Further, assume that read request 120 is received by e.g., server computer/controller 100 requesting portion 132 of content 118. Accordingly, cache management process 10 may process 200 read request 120; may obtain 202 portion 132 of content 118 from data array 130; and may divide 204 portion 132 of content 118 into plurality of file chunks 134, where the division algorithm is dependent on the file type.

As discussed above, cache management process 10 may compare 206 each of plurality of file chunks 132 to other file chunks already stored within first cache system 126 (namely the file chunks of the above-described four different files/file portions) to identify the unique file chunks included within plurality of file chunks 132. Assume for illustrative purposes that cache management process 10 divides 204 portion 132 into ten file chunks, namely file chunks 136, 138, 140, 142, 144, 146, 148, 150, 152, 154. Further assume for illustrative purposes that when comparing 206 each of plurality of file chunks 132 to other file chunks already stored within first cache system 126, cache management process 10 determines that only six file chunks (namely file chunks 136, 138, 140, 146, 150, 152) are unique (and may be stored 208 within first cache system 126) and that four file chunks (namely file chunks 142, 144, 148, 154) are not unique (and may not be stored 212 within first cache system 126). For the file chunks that are not unique (namely file chunks 142, 144, 148, 154) and, therefore, are not stored 212 within first cache system 126, the cache directory (not shown) associated with first cache system 126 may simply map the cache directory entry that is associated with each of the four non-stored file chunks to the file chunk included within first cache system 126 that is identical to each of the four non-stored file chunks.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD- ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   processing, on a host, a read request received from a client application separate from the host for a portion of a data file stored on a backend storage system, wherein the host is a server computer;
   obtaining the portion of the data file from the backend storage system;
   dividing the portion of the data file into a plurality of file chunks based, at least in part, upon a file type, wherein dividing the portion of the data file into a plurality of file chunks includes dividing the portion of the data file into a plurality of file chunks based, at least in part, upon a sticky bit algorithm, wherein the sticky bit algorithm is configured to calculate a hash value for a set amount of consecutive bytes of each data chunk, the sticky bit algorithm being further configured to identify a cut point associated with each data chunk, wherein the cut point is artificially created if the hash value modulo a constant is not zero for each data chunk;

comparing each of the plurality of file chunks to other file chunks stored within a first cache system located within the host to identify unique file chunks within the plurality of file chunks; and storing the unique file chunks within the first cache system.

2. The computer-implemented method of claim 1 wherein comparing each of the plurality of file chunks to other file chunks stored within the first cache system includes:

identifying non-unique file chunks within the plurality of file chunks.

3. The computer-implemented method of claim 2 further comprising:

not storing the non-unique file chunks within the first cache system.

4. The computer-implemented method of claim 1 wherein the portion of the data file is a complete data file.

5. The computer-implemented method of claim 1 wherein the plurality of file chunks have a common length and are aligned.

6. The computer-implemented method of claim 1 wherein the plurality of file chunks have differing lengths.

7. The computer-implemented method of claim 1 wherein the backend storage system includes a data array.

8. A computer program product residing on a non-transitory computer readable medium having a plurality of instructions stored thereon which, when executed by a processor, cause the processor to perform operations comprising:

processing, on a host, a read request received from a client application separate from the host for a portion of a data file stored on a backend storage system, wherein the host is a server computer;

obtaining the portion of the data file from the backend storage system;

dividing the portion of the data file into a plurality of file chunks based, at least in part, upon a file type, wherein dividing the portion of the data file into a plurality of file chunks includes dividing the portion of the data file into a plurality of file chunks based, at least in part, upon a sticky bit algorithm, wherein the sticky bit algorithm is configured to calculate a hash value for a set amount of consecutive bytes of each data chunk, the sticky bit algorithm being further configured to identify a cut point associated with each data chunk, wherein the cut point is artificially created if the hash value modulo a constant is not zero for each data chunk;

comparing each of the plurality of file chunks to other file chunks stored within a first cache system located within the host to identify unique file chunks within the plurality of file chunks; and storing the unique file chunks within the first cache system.

9. The computer program product of claim 8 wherein the instructions for comparing each of the plurality of file chunks to other file chunks stored within the first cache system include instructions for:

identifying non-unique file chunks within the plurality of file chunks.

10. The computer program product of claim 9 further comprising instructions for:

not storing the non-unique file chunks within the first cache system.

11. The computer program product of claim 8 wherein the portion of the data file is a complete data file.

12. The computer program product of claim 8 wherein the plurality of file chunks have a common length and are aligned.

13. The computer program product of claim 8 wherein the plurality of file chunks have differing lengths.

14. The computer program product of claim 8 wherein the backend storage system includes a data array.

15. A computing system comprising:

at least one processor device; and at least one memory architecture coupled with the at least one processor device;

wherein the at least one processor device is further configured to perform operations comprising;

processing, on a host, a read request received from a client application separate from the host for a portion of a data file stored on a backend storage system, wherein the host is a server computer;

obtaining the portion of the data file from the backend storage system;

dividing the portion of the data file into a plurality of file chunks based, at least in part, upon a file type, wherein dividing the portion of the data file into a plurality of file chunks includes dividing the portion of the data file into a plurality of file chunks based, at least in part, upon a sticky bit algorithm, wherein the sticky bit algorithm is configured to calculate a hash value for a set amount of consecutive bytes of each data chunk, the sticky bit algorithm being further configured to identify a cut point associated with each data chunk, wherein the cut point is artificially created if the hash value modulo a constant is not zero for each data chunk;

comparing each of the plurality of file chunks to other file chunks stored within a first cache system located within the host to identify unique file chunks within the plurality of file chunks; and storing the unique file chunks within the first cache system.

16. The computing system of claim 15 wherein comparing each of the plurality of file chunks to other file chunks stored within the first cache system includes:

identifying non-unique file chunks within the plurality of file chunks.

17. The computing system of claim 16 further configured to perform operations comprising:

not storing the non-unique file chunks within the first cache system.

18. The computing system of claim 15 wherein the portion of the data file is a complete data file.

19. The computing system of claim 15 wherein the plurality of file chunks have a common length and are aligned.

20. The computing system of claim 15 wherein the plurality of file chunks have differing lengths.

21. The computing system of claim 15 wherein the backend storage system includes a data array.

22. The computer-implemented method of claim 1 wherein the cut point is artificially created based, at least in part, upon an addition of one or more bytes in each data chunk.

23. The computer program product of claim 8 wherein the cut point is artificially created based, at least in part, upon an addition of one or more bytes in each data chunk.

24. The computing system of claim 15 wherein the cut point is artificially created based, at least in part, upon an addition of one or more bytes in each data chunk.

* * * * *